(12) United States Patent
Belden, Jr.

(10) Patent No.: US 6,196,384 B1
(45) Date of Patent: Mar. 6, 2001

(54) STORAGE CONTAINER FOR RECORDED MEDIA

(75) Inventor: Dennis D. Belden, Jr., Canton, OH (US)

(73) Assignee: Alpha Enterprises, Inc., North Canton, OH (US)

(*) Notice: Subject to any disclaimer, the term of this patent is extended or adjusted under 35 U.S.C. 154(b) by 0 days.

(21) Appl. No.: 09/282,484

(22) Filed: Mar. 31, 1999

Related U.S. Application Data (60) Provisional application No. 60/080,363, filed on Apr. 1, 1998.

(51) Int. Cl.[7] .................................................. B65D 85/57
(52) U.S. Cl. ........................................ 206/308.1; 206/310
(58) Field of Search ................................ 206/307, 308.1, 206/309, 310, 493

(56) References Cited

U.S. PATENT DOCUMENTS

| | | | |
|---|---|---|---|
| 4,793,479 | 12/1988 | Otsuka et al. | 206/310 |
| 5,238,107 | 8/1993 | Kownacki | 206/310 |
| 5,251,750 | 10/1993 | Gelardi et al. | 206/310 |
| 5,400,902 | * 3/1995 | Kaminski | 206/310 |
| 5,417,324 | 5/1995 | Joyce et al. | 206/310 |
| 5,526,926 | 6/1996 | Deja | 206/308.1 |
| 5,586,651 | * 12/1996 | Krummenacher | 206/310 |
| 5,660,274 | * 8/1997 | Chien | 206/308.1 |
| 5,685,427 | * 11/1997 | Kuitems et al. | 206/310 |
| 5,727,680 | * 3/1998 | Liu | 206/310 |
| 5,746,315 | * 5/1998 | Luckow | 206/310 |
| 5,788,068 | 8/1998 | Fraser et al. | 206/310 |
| 5,829,582 | * 11/1998 | Ippolito et al. | 206/308.1 |
| 5,887,713 | 3/1999 | Smith et al. | 206/308.1 |

FOREIGN PATENT DOCUMENTS 34 25 579 A1    7/1984   (DE) .

\* cited by examiner

*Primary Examiner*—Jim Foster
(74) *Attorney, Agent, or Firm*—Sand & Sebolt (57) ABSTRACT

A storage container for holding an item of recorded media includes a base; an outer wall extending upwardly from the base, the outer wall having an upper surface adapted to receive the lower surface of item adjacent the outer diameter of item. The storage container also includes a retaining hub that extends upwardly from the base. The retaining hub includes a plurality of hinged arms and fixed supports. A retaining lip is carried by the hinged arms. The retaining lip engages the upper surface of the item in a storage position and is moveable inwardly and downwardly to release item. Retaining lip also engages the lower surface of item to lift item from the storage container. The fixed supports include an upper surface that remains in position during the removal of item to provide support to item to substantially prevent bending forces from damaging item.

29 Claims, 6 Drawing Sheets

STORAGE CONTAINER FOR RECORDED MEDIA

CROSS REFERENCE TO RELATED APPLICATIONS

This application claims the benefit of currently-pending U.S. provisional application serial No. 60/080,363, filed Apr. 11, 1998, the disclosures of which are incorporated herein by reference.

BACKGROUND OF THE INVENTION

1. Technical Field

This invention relates generally to storage containers for recorded media and, more particularly, to a storage container having a centrally disposed retaining hub for engaging and selectively retaining an item of recorded media. Specifically, the present invention is directed to a storage container for recorded media employing a retaining hub that releasably secures an item of recorded media such as a DVD while substantially protecting the stored item from bending stresses created during loading, storage, and removal of the item from the storage container.

2. Background Information

Compact discs have become immensely popular in the past 15 years and have supplanted records and tapes as the dominant form of recorded music. Over this time, numerous storage containers have been developed to hold the discs during shipping, display for sale, and subsequent home storage of the discs. Most of these storage containers utilize some type of center hub that engages the center hole of the disc to hold the disc in place in the storage container.

In the recent past, digital versatile discs (DVDs) have been developed that hold more data than a compact disc. Given their large storage capacity, DVDs may be used to hold feature length films as well as music. It is also contemplated that the DVDs may be used to hold data in a computer readable form. One problem with the DVD is that it currently trades durability for its increased storage space. It has been found that a DVD may be damaged by the forces that are commonly used to remove compact discs from their storage containers, to hold the compact discs in the storage containers, and to store the compact discs in the containers. Thus, a potential problem has been created in that it is believed that the vast number of consumers will treat a DVD like a CD because of the similarities in the products and will damage the DVD by doing things that do not harm a CD. It is thus desired in the art to provide a DVD storage container that prevents a consumer from damaging a DVD by improperly removing a DVD from the container.

One of the chief areas of concern with a DVD storage container is the bending forces created in the DVD by the container or removal of the DVD from the container. Although compact discs are relatively insensitive to bending stresses, DVDs are sensitive to such bending forces and may lose information or become unusable because of such bending forces. Bending forces may occur during removal of the DVD from the storage container, loading the DVD into the storage container, or storage of the DVD in the container. The industry has thus moved in a direction that requires DVD storage containers to securely retain a DVD during a drop test without creating a constant bending force on the DVD during storage or allowing a bending force to be placed on the DVD during installation or removal of the DVD from the storage container.

Although a DVD is approximately the same size, weight, and dimensions as a compact disc, the storage containers used for compact discs are generally unsuitable for providing a DVD storage container that eliminates bending forces. Most CD storage containers are unsuitable for DVDs because they include center hubs that radially and resiliently engage the center hole of a compact disc to retain the compact disc in the storage container. It has been recently determined that such radial engagement creates a constant force on a DVD that eventually warps the DVD rendering it imperfect or unuseable. Other compact disc storage containers allow a person to grasp the outer edge of a compact disc and pull upwardly causing the disc to disengage the center hub. This action creates a significant amount of bending force in the body of the compact disc. As compact discs are less sensitive to such bending force, this action does not substantially harm a compact disc while it may break a DVD or otherwise render it unuseable.

One device that holds a CD in a manner that reduces the large bending forces experienced by the CD during removal of the CD from the storage container is disclosed in German reference DE 3425579. This device retains the CD with a central hub having a lip. A plurality of spring members are disposed about the central hub and are configured to resiliently engage the bottom surface of the CD when it is stored in the container. The CD is thus trapped between the spring members and the lip during storage. The CD is released by depressing the center button which collapses into the center hole of the CD. Once the lip of the hub is moved inwardly, the spring members pop the CD up to a position where it may be removed from the storage container.

Unfortunately, the spring members create a constant force on the bottom of the CD which creates a small constant bending force in the CD. Although this force is not large enough to damage a CD over time, it is large enough to slightly warp a DVD when the DVD is stored over long periods of time. This slight warp may render the DVD unusable.

Other embodiments of a storage device disclosed in the German patent utilize lever arms that lift the CD or DVD off of the retaining hub when the center button is depressed. Although these lifting arms are effective for lifting the CD or DVD off of the hub, the center hub does not release the item of recorded media without creating bending forces. These embodiments are also more difficult to manufacture than embodiments without lifting arms.

Another device that may be used to hold an item of recorded media such as a compact disc is disclosed in U.S. Pat. No. 5,685,427. The device in this patent allows a compact disc to be removed from the storage container through the engagement of a ridge with the inner wall that forms the central opening of the CD. In the storage position, the ridge rests on the top surface of the CD. When a person removes the CD from the container, the ridge is forced along the inner wall creating a bending force in the CD. The specification describes that the force is significant enough that there is a slight clicking action as the ridge passes below the lower surface of the disc and grasps the disc. This device also captures the interior wall of the central opening in the CD while the CD is being removed from the holder. Such capturing creates an undesirable radially outward bending force in the CD or DVD while it is being removed from the holder.

In view of the damage created by the slight bending forces, the DVD industry has moved in the direction of requiring DVD storage containers to hold the DVDs without imparting any bending forces on the DVD. One manner of indicating that no bending forces are imparted on the DVD is by allowing the DVD to freely rotate while in the storage position. The devices described above do not allow the CD or DVD to freely rotate because the devices retain the CD or DVD with constant forces.

It is thus desirable to provide a storage container for recorded media such as a DVD that securely retains the item of recorded media in the storage container while not subjecting the item to significant bending stresses that can damage the item.

SUMMARY OF THE INVENTION

In view of the foregoing, a primary objective of the present invention is to provide a storage container for an item of recorded media such as a DVD.

Another objective of the present invention is to provide a storage container for an item of recorded media that securely retains the item while not subjecting the item to bending forces during storage.

Yet another objective of the present invention is to provide a storage container for an item of recorded media that allows the item of recorded media to be removed from the storage container without subjecting the item to substantial bending forces.

Still another objective of the present invention is to provide a storage container for an item of recorded media that prevents the improper removal of the item of recorded media from the storage container.

Another objective of the present invention is to provide a storage container for an item of recorded media that drops completely below the lower surface of the item and lifts the item from the storage container from below without engaging the inner wall that forms the centrally-disposed hole in the item.

A further objective of the present invention is to provide a storage container for an item of recorded media that allows the item of recorded media to be rotated within the storage container during storage.

Still a further objective of the present invention is to provide a storage container for an item of recorded media that includes a collapsible center hub that may be used to lift the item of recorded media from a storage position into a removal position without significantly stressing the item of recorded media.

Yet a further objective of the present invention is to provide a storage container for an item of recorded media that includes a retaining hub having a plurality of fixed rigid supports that provide support to the item of recorded media adjacent its center portion with the storage container also having an annular outer ledge that provides support to the item of recorded media adjacent its outer diameter.

Another objective of the present invention is to provide a storage container for an item of recorded media having rigid inner supports that do not engage the information-containing area of the item of recorded media.

Another objective of the present invention is to provide a storage container for an item of recorded media that does not allow the central portion of the item of recorded media to be flexed downwardly during installation or removal of the item.

Another objective of the present invention is to provide a storage container for an item of recorded media having a retaining hub that must be fully depressed and released prior to removing the item of recorded media from the storage container.

Another objective of the present invention is to provide a storage container for an item of recorded media having a plurality of raised bumps that solely support the item of recorded media from below to reduce friction between the storage container and the item of recorded media allowing the item of recorded media to rotate or spin in the storage container.

Another objective of the present invention is to provide a storage container for an item of recorded media that includes a centrally disposed projection that retains the position of the item of recorded media when it is in a released position so that the item of recorded media does not slip off of the storage container.

A further objective of the present invention is to provide a storage container for an item of recorded media that is of simple construction, which achieves the stated objectives in a simple, effective, and inexpensive manner, and which solves the problems and satisfies the needs existing in the art.

These and other objectives and advantages are obtained by the storage container for an item of recorded media of the present invention, the general nature of which may be stated as including the combination of a disc-shaped item of recorded media having an upper surface, a lower surface, a thickness, an outer diameter, and a centrally-disposed, substantially circular opening; and a storage container for holding the item of recorded media; the storage container having a base; a retaining hub extending upwardly from the base; the retaining hub having at least a first fixed support and at least one retaining lip; at least one bump extending up from the first fixed support; and the item of recorded media being disposed between the at least one bump and the at least one retaining lip.

Other objectives and advantages of the present invention are achieved by a storage container for an item of recorded media having an upper surface, a lower surface, a thickness, an outer diameter, and a centrally-disposed, substantially circular opening; the storage container including a base; a retaining hub projecting up from the base; the retaining hub including at least three resilient arms cantilevered from the base and at least three fixed supports, one of the fixed supports disposed between each pair of resilient arms; a retaining lip formed on each retaining arm, each retaining lip adapted to engage the upper surface of the item of recorded media; each of the three resilient arms being movable between first and second positions; each resilient arm adapted to support the lower surface of the item of recorded media in the first position; each fixed support disposed at substantially the same level as each resilient arm when the resilient arm is in the first position; and each resilient arm being disposed below each fixed support when the resilient arm is in the second position.

Further objectives and advantages of the present invention are achieved by a method for removing an item of recorded media from a storage container; the item of recorded media having a centrally-disposed, substantially circular opening; the storage container having a retaining hub that includes a plurality of resilient arms and a plurality of fixed supports; the resilient arms disposed in the opening of the item of recorded media to retain the item of recorded media on the retaining hub; the method including the steps of depressing the arms to release the item of recorded media; supporting the item of recorded media adjacent the opening with the fixed supports to prevent the center of the item of recorded media from deflecting when the arms are depressed; releasing the arms; lifting the item of recorded media off of the fixed supports with the arms; and removing the lifted item of recorded media from the arms.

Another objective of the present invention is to provide a storage container for an item of recorded media that includes a method for removing an item of recorded media from a storage container; the item of recorded media having a centrally-disposed, substantially circular opening; the storage container having a retaining hub that includes a plurality of resilient arms connected by a center button; the resilient arms disposed in the opening of the item of recorded media to retain the item of recorded media on the retaining hub; the method including the steps of depressing the center button causing the arms to move radially inward and down; releasing the center button allowing the arms to lift the item of recorded media.

BRIEF DESCRIPTION OF THE DRAWINGS

The preferred embodiments of the invention, illustrative of the best mode in which the applicant has contemplated applying the principles of the invention, are set forth in the following description and are shown in the drawings and are particularly and distinctly pointed out and set forth in the appended claims.

Similar numbers refer to similar parts throughout the drawings.

DESCRIPTION OF THE PREFERRED EMBODIMENT

An embodiment of the storage container for an item of recorded media made in accordance with the concepts of the present invention is depicted in the accompanying drawings and is indicated generally by the numeral 10. Storage container 10 includes a base, indicated generally by the numeral 12, that is hingedly attached to a lid 14. In the embodiment of the present invention depicted in the drawings, the hinged connection between base 12 and lid 14 is formed by a back wall 16 and a pair of continuous living hinges 18. Base 12 includes a side wall 20 that extends about the three sides of base 12 not attached to living hinge 18. Side wall 20 includes a plurality of reinforcing ribs 22 that serve to reinforce storage container 10 and may also be used to frictionally engage corresponding reinforcing ribs 24 that are carried by lid 14 and a lid side wall 26. Container 10 may be fabricated from any of a wide variety of materials but it is preferred that it be fabricated from a plastic strong enough to resist breaking when dropped during a drop test.

Figure 1:
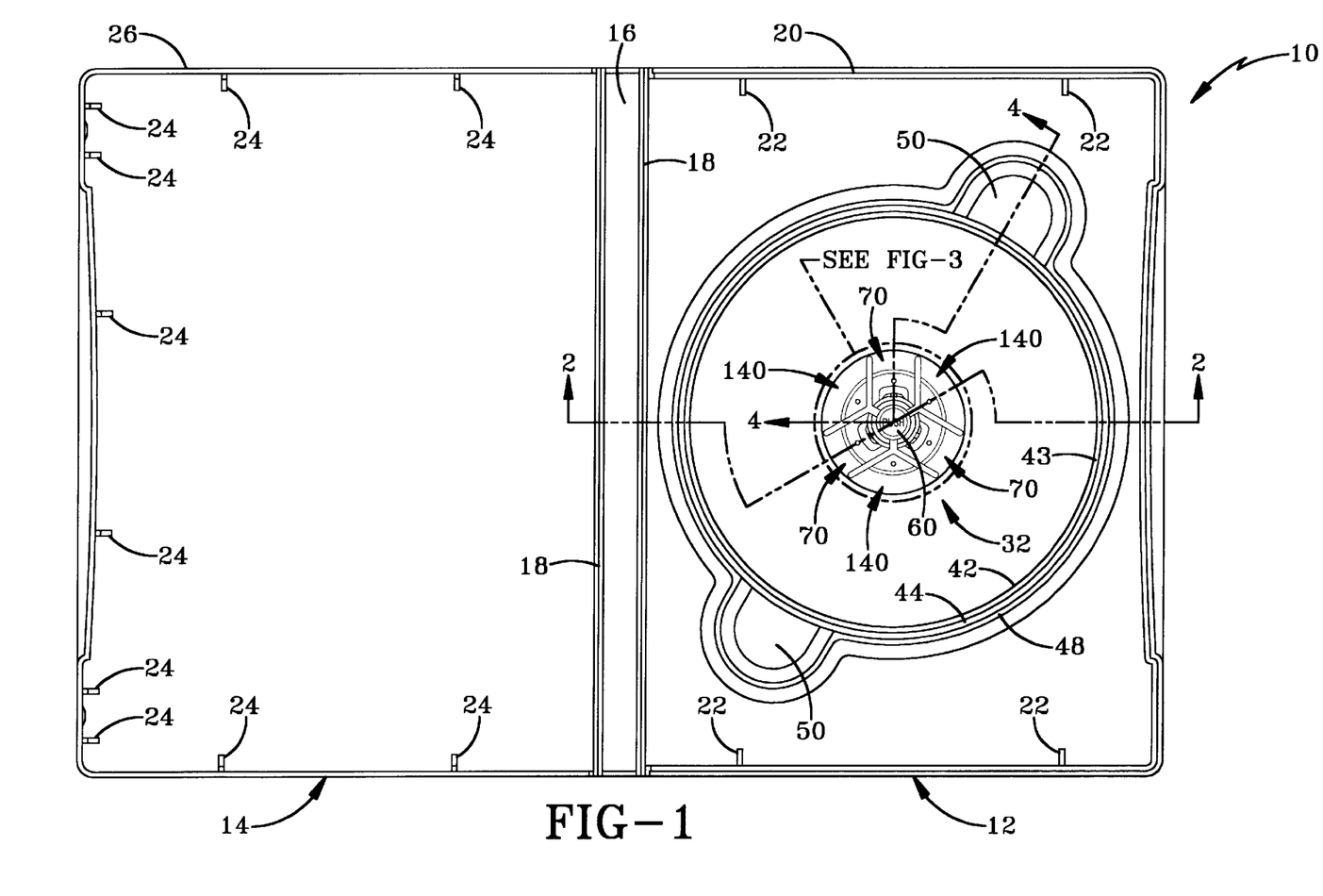
FIG. 1 is a top plan view of a storage container for an item of recorded media depicted in an open position.
Figure 2:
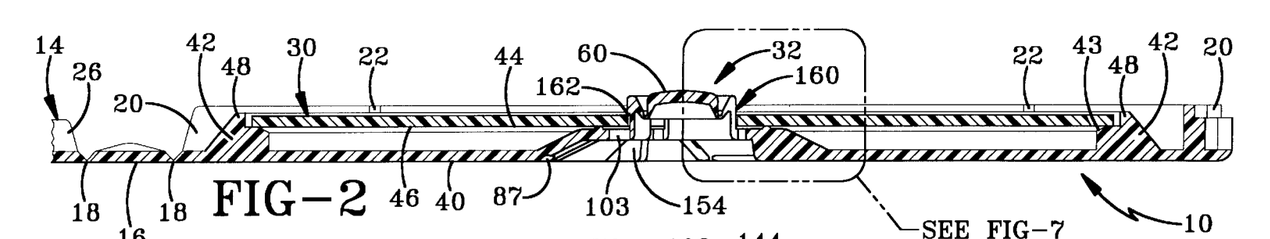
FIG. 2 is a sectional view taken along line 2—2 of FIG. 1.

As may be seen in FIG. 2, an item of recorded media 30 may be securely retained by storage container 10 through the engagement of a retaining hub 32 with item 30. Item 30 may be a DVD but it is to be understood that container 10 may be used to store other items 30 such as compact discs containing music or computer readable data. As will be described in detail below, retaining hub 32 securely retains items 30 in storage container 10 without creating bending forces in item 30 during loading of item 30 onto retaining hub 32, during storage of item 30 in container 10 as depicted in FIG. 2, or during removal of item 30 from storage case 10. By providing such functions without creating bending forces in item 30, storage container 10 achieves one of the primary objectives of the present invention. Although container 10 depicted in FIG. 1 only includes a single retaining hub 32, it is to be understood that multiple retaining hubs 32 may be provided in similar containers to hold multiple items 30.

Base 12 includes a substantially planar base wall 40 that extends between retaining hub 32 and sidewall 20 of base 12. An annular outer wall 42 extends upwardly from base wall 40 below the outer edge of item 30. As may be perhaps best seen in FIG. 1, annular outer wall 42 extends entirely about the area where item 30 is received and is substantially circular in shape. Annular outer wall 42 has an upper surface 44 upon which the lower surface 46 of item 30 rests when item 30 is in the storage position depicted in FIGS. 2 and 4. Annular outer wall 42 is sized and configured such that the contact between upper surface 44 and lower surface 46 does not extend into the area of item 30 that includes recorded information. A chamfer 43 may be provided to create a smooth transition between surface 44 and the sidewall of wall 42. Annular outer wall 42 prevents the outer portion of item 30 from being moved lower than upper surface 44.

Figure 9:
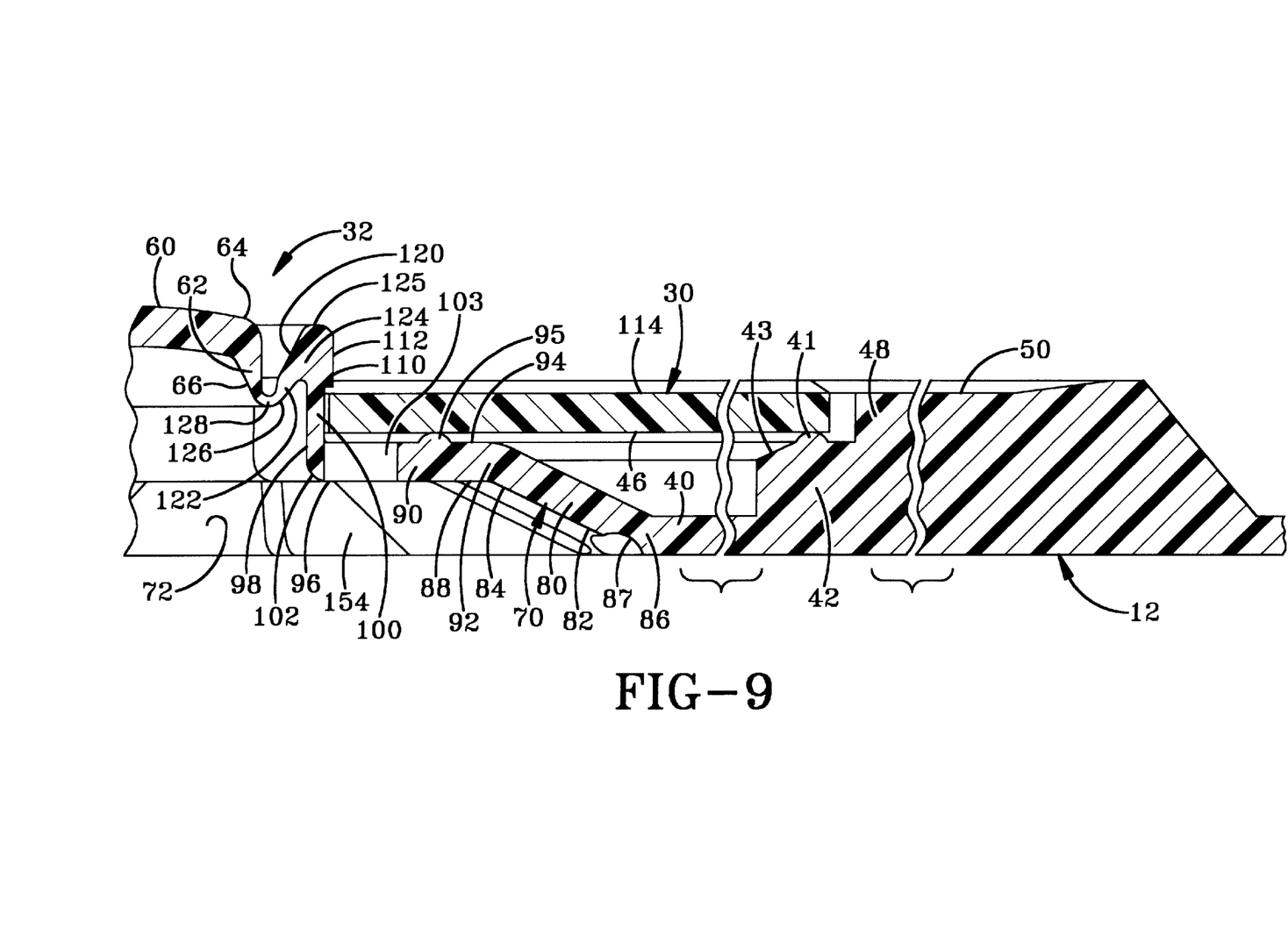
FIG. 9 is a sectional view depicting an alternative embodiment of the present invention.

Another embodiment of the invention is depicted in FIG. 9 with an alternative outer wall 42. Outer wall 42 of this embodiment includes a plurality of bumps 41 that extend upwardly from surface 44 such that item 30 is only supported on bumps 41. This arrangement reduces friction between item 30 and wall 42. This embodiment functions substantially similarly to the embodiment described in detail below with the exception that the upper surface of bumps 41 is on the same plane as the upper surface of bumps 95.

In accordance with another aspect of the present invention, a blocking wall 48 extends upwardly from upper surface 44 of outer wall 42 radially outside the outer radial dimension of item 30. Blocking wall 48 is positioned such that it does not contact item 30 when item 30 is retaining by hub 32. Blocking wall 48 has a height that is greater than the thickness of item 30 as indicated by the dimension line labeled with numeral 49 such that a person cannot grasp the edge of item 30 when item 30 is in the storage position depicted in FIGS. 2 and 4. There are, however, two finger holes 50 formed in base 12 where the height of blocking wall 48 is reduced. Although finger holes 50 are not intended to allow a person to grasp the edge of item 30, finger holes 50 allow a person to more easily grasp item 30 when it is in the released position depicted in FIG. 6. Blocking wall 48 achieves one of the objectives of the present invention by preventing a person from grasping an edge of item 30 and pulling upwardly. Such a practice is common when removing a compact disc from a compact disc storage container. If performed on a DVD held in storage container 10, retaining hub 32 would maintain its engagement with the DVD and the upward force at its edge would likely break or otherwise damage the DVD by creating a large bending force. It may thus be understood that annular outer wall 42 and blocking wall 48 prevent the removal of item 30 without first removing item 30 from retaining hub 32.

As noted above, storage container 10 includes retaining hub 32 that extends upwardly from base wall 40. Retaining hub 32 is configured to retain item 30 until it is subjected to a downward force which is subsequently released. The downward force causes hub 32 to collapse inwardly and downwardly to completely release item 30. When the force is removed, hub 32 contacts the bottom of item 30 and lifts it into the position depicted in FIG. 6 where it may be removed. Retaining hub 32 is also configured to retain item 30 in a manner such that it may freely rotate on hub 32 in the storage condition depicted in FIG. 4.

Retaining hub 32 includes a center button 60 that is substantially circular and includes a downwardly extending, circumferential, substantially cylindrical side wall 62 that has an upper end 64 and a lower end 66. Center button 60 preferably is domed to extend upwardly to provide an easy target for a person using storage case 10. A plurality of hinged arms, each indicated generally by the numeral 70, moveably support center button 60 a distance above the plane of base wall 40. Arms 70 and button 60 thus form a continuous element from one side of hub 32 to another. It may thus be understood that a cavity 72 is formed below hinged arms 70 and hub 32. Cavity 72 provides space that allows retaining hub 32 to be moved between the storage position depicted in FIG. 4 and the collapsed position depicted in FIG. 5.

Each of hinged arms 70 extends upwardly from base wall 40 to engage item 30 and support center button 60. Each hinged arm 70 includes a first arm section 80 having a first end 82 and a second end 84. First end 82 of first arm section 80 is connected to base wall 40 by a first hinge 86. Hinge 86 may be in the form of a living hinge as depicted in the drawings. A hinge 86 is provided with a scalloped portion 87 that decreases the thickness of hinge 86 allowing it to flex or bend more easily. Second end 84 of first arm section 80 is attached to a first end 88 of a second arm section 90 by a second hinge 92. Second hinge 92 may also be a living hinge. Second arm section 90 may be substantially parallel to base wall 40 when retaining hub 32 is the first position depicted in FIGS. 4 and 6. Second arm section 90 includes an upper surface 94 that is slightly below upper surface 44 of annular outer wall 42 but is substantially parallel to upper surface 44 and lower surface 46 of item 30. In the preferred embodiment of the invention, upper surface 94 is approximately 0.02 inches below the plane of upper surface 44 and lower surface 46 of item 30. A bump 95 projects upwardly from each upper surface 94 to a level substantially equal to the level of upper surface 44 of outer wall 42 to engage lower surface 46 of item 30. First arm section 80 is angled upwardly from base wall 40 and second arm section 90 is sized such that bump 95 of second arm section 90 does not contact the area of recorded information on lower surface 46 of item 30. Bumps 95 minimize the contact between item 30 and arm 70 allowing item 30 to spin on hub 32 with little friction.

Figure 3:
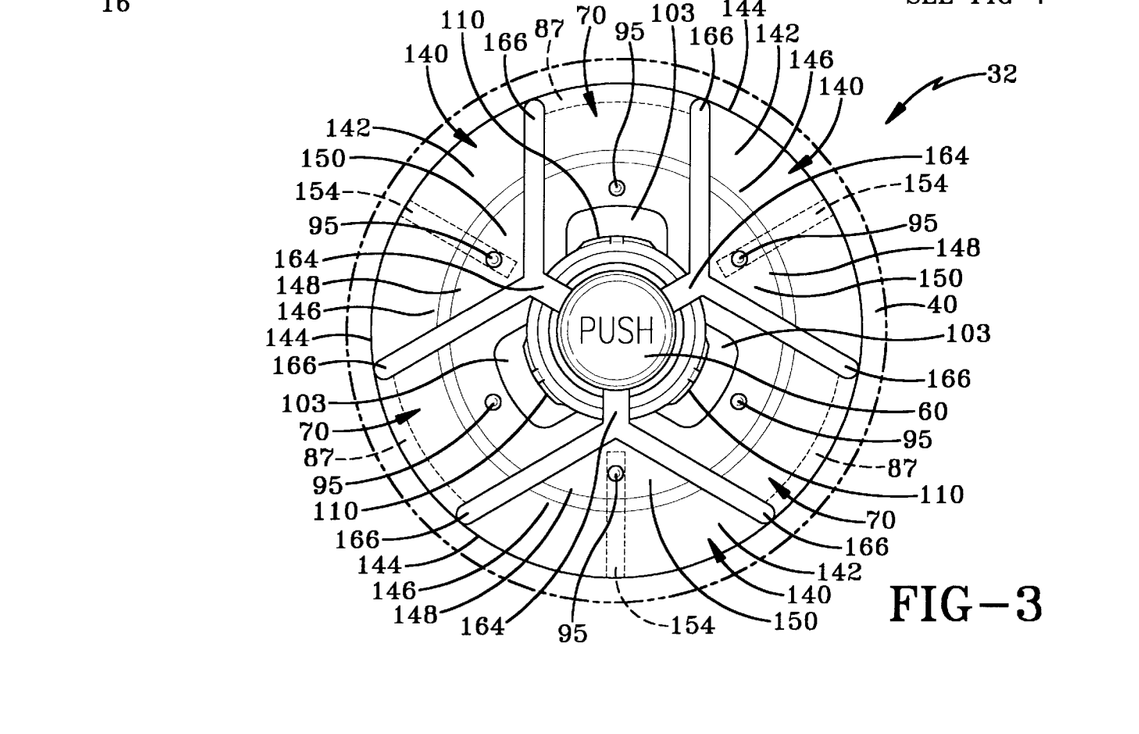
FIG. 3 is an enlarged view of the retaining hub encircled by the line labeled FIG. 3 in FIG. 1.

Second arm section 90 has a second end 96 that is connected to a first end 98 of a third arm section 100 by a third hinge 102. Second end 96 of second arm section 90 is cut out with an opening 103 that substantially decreases the thickness of third hinge 102 to allow it to flex more easily. Opening 103 also increases the manufacturability of hub 32 and decreases the amount of material used to fabricate hub 32. Thus, third hinge 102 is a pair of relatively thin hinges that connect second arm section 90 to third arm section 100 on either side of opening 103 as seen in FIG. 3. Third hinge 102 may also be a living hinge. Third arm section 100 includes an outer surface 104 that has a radius of curvature that is less than the radius of curvature of inner wall 106 of item of recorded media 30. Thus, it may be understood that item 30 is not radially resiliently engaged by arms 70 to retain item 30 on hub 32. As may be perhaps best seen in FIG. 2, outer surfaces 104 of arms 70 cooperate to form a substantially continuous cylindrical wall 160 that is disposed within the centrally-disposed hole 162 of item 30. Wall 160 is only broken by a plurality of slots 164 that separate third arms sections 100 from each other. Each slot 164 branches out at the bottom of third arm sections 100 to form two secondary slots 166 that define the widths of hinged arms 70. Secondary slots 166 are disposed such that each first arm section 80 and each second arm section 90 has a substantially constant overall width.

Figure 4:
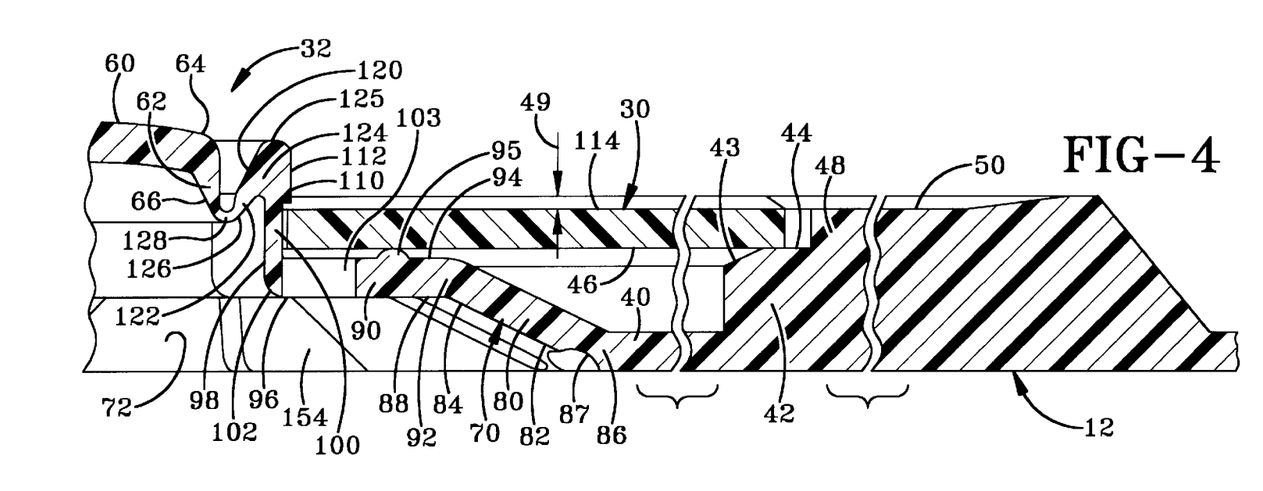
FIG. 4 is a sectional view taken along line 4—4 of FIG. 1 showing the retaining hub in a first position with the item of recorded media retained by the storage container.
Figure 6:
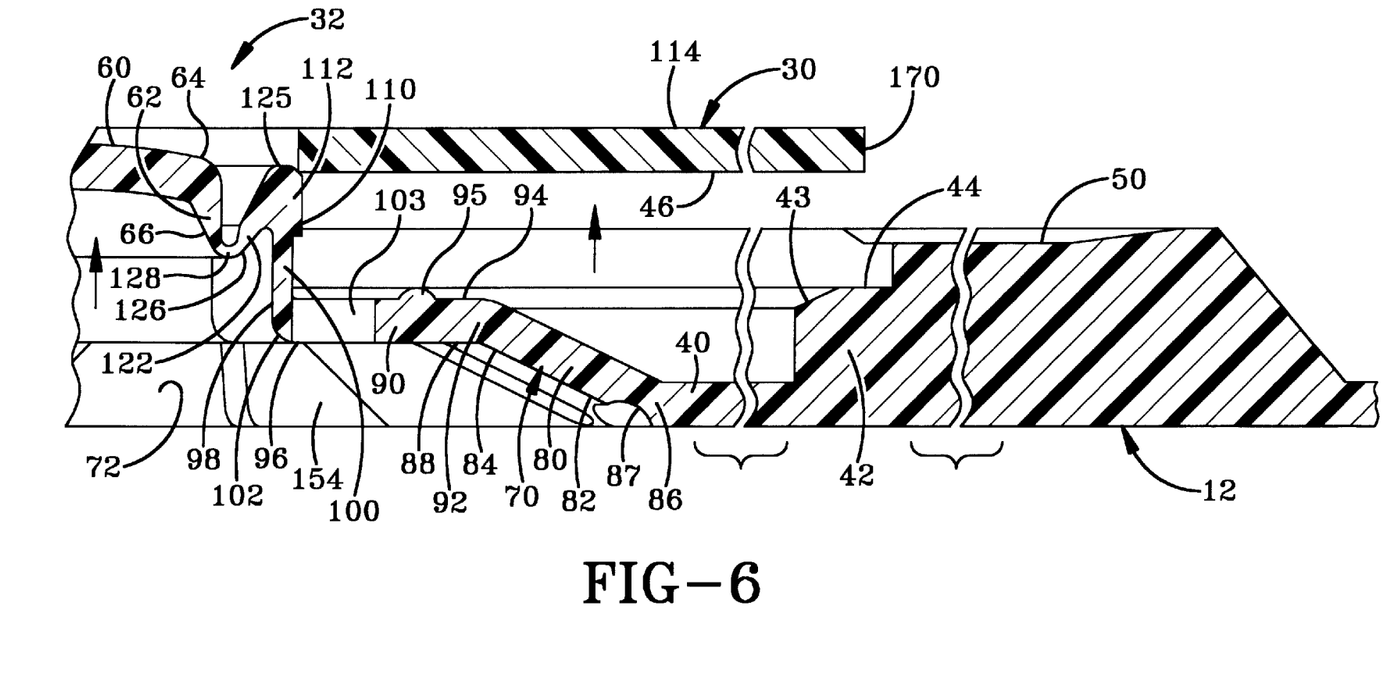
FIG. 6 is a sectional view similar to FIGS. 4 and 5 depicting the retaining hub back in the first position with the item of recorded media being released by the storage container.
Figure 7:
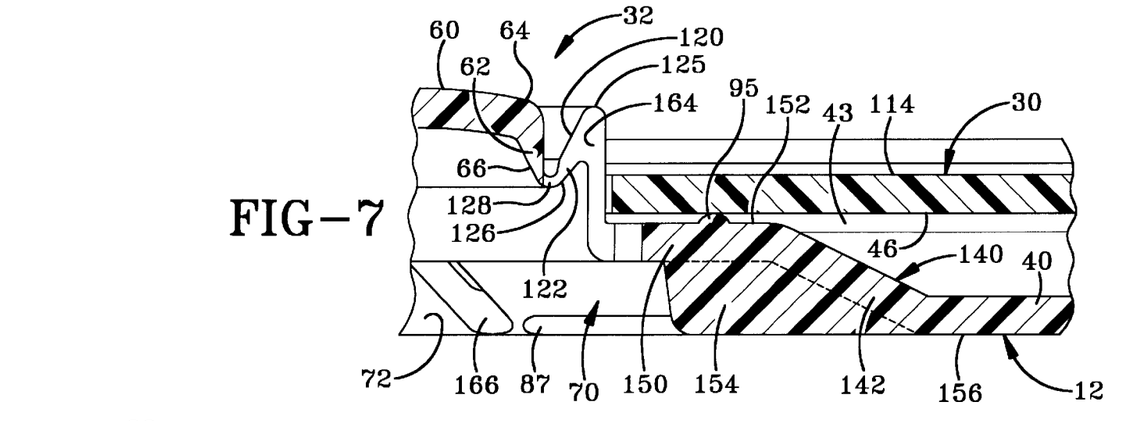
FIG. 7 is an enlarged view of the portion of the retaining hub encircled in FIG. 2.

Third arm section 100 is substantially normal to base wall 40 in the first position depicted in FIGS. 4 and 6. A retaining lip 110 is carried by third arm section 100 at the second end 112 of third arm section 100. Retaining lip 110 is adapted to engage at least a portion of the upper surface 114 of item 30 to retain item 30 on retaining hub 32 even when container 10 is turned upside down or subjected to impact forces.

Second end 112 of third arm section 100 is attached to a first end 120 of a fourth arm section 122 by a fourth hinge 124. Fourth hinge 124 may also be a living hinge. Second end 112 of third arm section 100 projects upwardly through projection 125 to provide a retaining device to hub 32 that maintains the position of item 30 when item 30 is in the released position sitting on the upper surface of retaining lip 110. Projections 125 are disposed inwardly of retaining lip 110 such that their outer surfaces have a radius no greater than outer surfaces 104 of arms 70. Second end 126 of fourth arm section 122 is connected to lower end 66 of side wall 62 by a fifth hinge 128. Fifth hinge 128 may also be a living hinge and is substantially thinner than the other hinges as shown in the drawings. The thinness of first hinge 86 and fifth hinge 128 allows them to bend much more easily than the other hinges 92, 102, and 124 when hub 32 is subjected to a downward force.

Retaining hub 32 also includes a plurality of fixed supports 140 disposed between hinged arms 70 in accordance with another aspect of the present invention. Each fixed support 140 is separated from hinged arms 70 by secondary slots 166. Each fixed support 140 includes a first support section 142 that extends upwardly from base wall 40 at substantially the same angle as first arm section 80. First support section 142 includes a first end 144 attached to base wall 40 and a second end 146 attached to a first end 148 of a second support section 150. Second support section 150 is disposed substantially parallel to base wall 40 and includes an upper surface 152. Fixed supports 140 are sized such that upper surface 152 of each second support section 150 is substantially coplanar with upper surface 94 of second arm section 90. As discussed above with respect to hinged arms 70, each second support section 150 is sized and shaped so that it does not engage item 30 in an area containing recorded information.

Each second support section 150 includes one bump 95 that is substantially similar to bumps 95 on arms 70. Bumps 95 on second support section 150 provide constant support adjacent the center of item 30 so that item 30 is not damaged during removal of item 30 from hub 32. Bumps 95 on second support section 150 prevent the center of item 30 from being deflected downwardly. Gussets 154 are provided beneath each fixed support to provide additional support if needed.

Each fixed support 140 is non-moveable and remains in position when hinged arms 70 function to release item 30 by collapsing inwardly and downwardly. By remaining in position, fixed supports 140 provide support to item 30 adjacent its center once bumps 95 on arms 70 are lowered.

An item 30 of recorded media is depicted in FIG. 4 in the storage position with retaining hub 32 in the first position. While in the storage position, item 30 may not be removed from storage container 10 without either depressing retaining hub 32 or significantly damaging item 30 or container 10. Item 30 is supported from below by upper surface 44 of outer wall 42 and bumps 95 of arms 70. Item 30 is supported from above by retaining lip 110. Item 30 is not, however, supported in any way through engagement of outer surfaces 104 of third arm sections 100 with item 30. As such, there is no radial resilient force between outer wall 104 of third arm section 100 and item 30.

When a person wants to remove item 30 from storage container 10, the person creates a downward force on center button 60 causing hinged arms 70 to collapse inwardly and downwardly causing lip 110 to disengage upper surface 114 of item 30. This also causes bumps 95 on arms 70 to move downwardly and disengage item 30 leaving item 30 to be supported by bumps 95 on second support sections 150.

Figure 5:
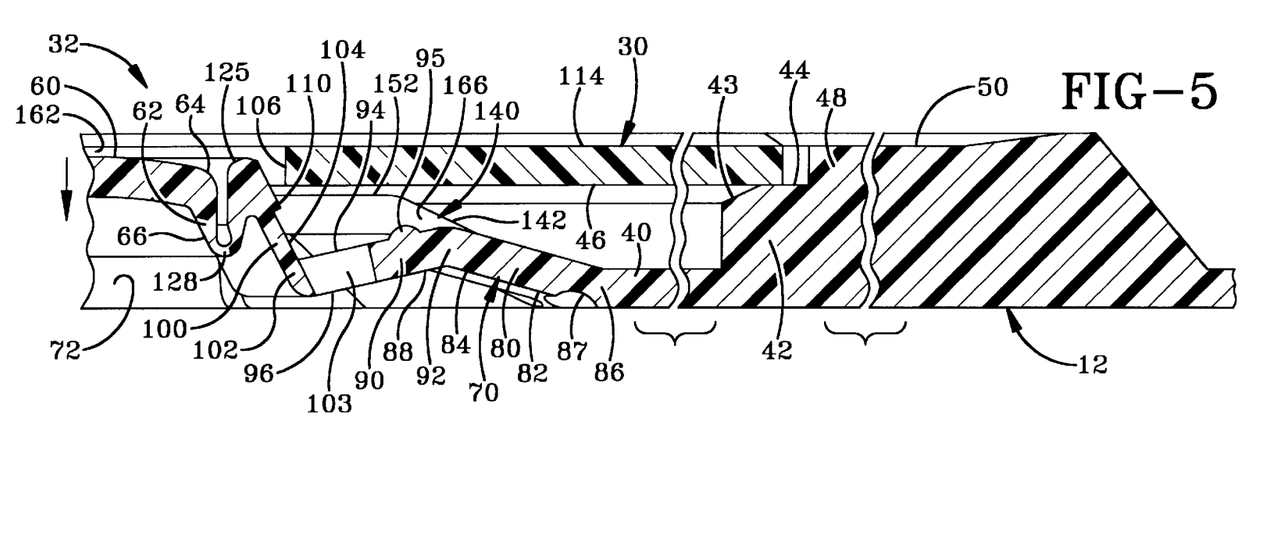
FIG. 5 is a sectional view similar to FIG. 4 depicting the retaining hub in a second position.

As may be seen in FIG. 5, the downward force causes fifth hinge 128 to close drawing retaining lip 110 radially inwardly. The downward force also causes first hinge 86, second hinge 92, and third hinge 102 to open allowing center button to move down drawing retaining lip 110 down with it. The person removing item 30 continues to apply the downward force until retaining lip 110 is below lower surface 46 of item 30. As shown in FIG. 5, second arm section 90 is angularly disposed with respect to the plane of base wall 40 at this time. Third arm section 100 is also pulled inwardly at an angle and is no longer normal to the plane of base wall 40. Furthermore, first arm section 80 has been moved downwardly and is no longer disposed at the same angle as first support section 142.

The person removing item 30 then releases the downward force on center button 60 allowing retaining lip 110 to contact lower surface 46. Hub 32 is configured to not capture the inner edge of the center hole of item 30. Such action creates a warping force in item 30 as arms 70 press radially outwardly on item 30 from inside its center opening. Arms 70 are thus designed to engage the bottom surface 46 of item 30 and lift item 30 vertically upwardly with no warping forces. As hinged arms 70 return to the first position of retaining hub 32, lip 110 lifts item 30 off of upper surface 44 of annular outer wall 42 and bumps 95 of fixed supports 140 allowing the person to grasp the outer edge 170 of item 30 and remove it from storage container 10. Item 30 is retained by projections 125 prior to removal by the person.

Hub 32 is also configured to retain item 30 on projections 125 even when item 30 is loosely retained as shown in FIG. 6. A right-handed person will typically hold storage container 10 in the left hand while pushing center button 60 with a finger of the right hand. In this position, hinges 18 are usually in the left palm and one of arms 70 is disposed straight up, parallel to hinges 18, so that item 30 does not readily fall off if container 10 is tilted.

It may thus be understood that no bending forces are experienced by item 30 during removal of item 30 from storage container 10. Bending forces are prevented because item 30 is supported during the collapse of arms 70 about its radial outer edge and its radial inner edge by upper surface 44 and bumps 95. Upper surface 44 and bumps 95 also prevent damaging bending forces when item 30 is replaced onto retaining hub 32. Item 30 is replaced by aligning its center hole with retaining lip 110 and providing a downward force on item 30. The downward force causes retaining lip 110 to move downwardly and inwardly allowing item 30 to contact bumps 95. When such contact is made, the downward force is removed and retaining lip 110 is moved back to the storage position by hinged arms 70 where it engages upper surface 114 of item 30.

Figure 8:
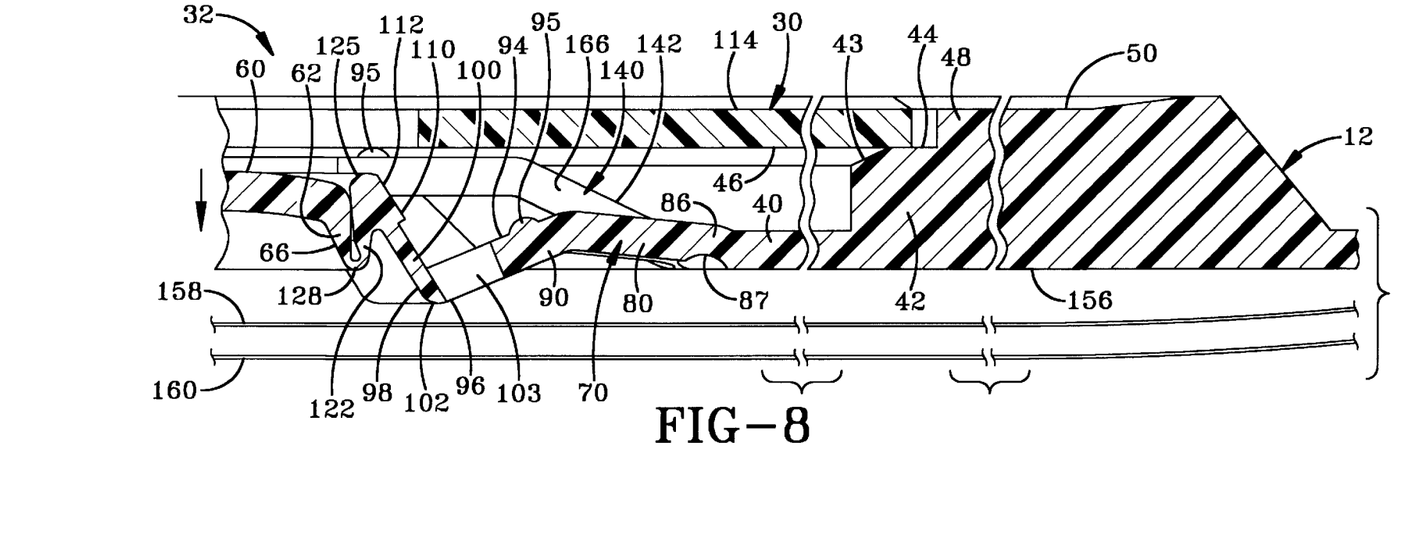
FIG. 8 is a view similar to FIG. 5 with the hinged arms depressed below the lower surface of the base wall.

Hub 32 is also configured such that arms 70 may pass below the lower surface 156 of wall 40 as shown in FIG. 8. Arms 70 may pass below lower surface 156 because no rigid surfaces are disposed below cavity 72. Only a card 158 containing information and a clear, flexible layer 160 are disposed below cavity 72. Layer 160 is loose enough to allow arms 70 to move card 158 out of the way such that arms 70 may fully collapse. This provides extra room for arms 70 to collapse during removal of item 30 for container 10.

Accordingly, the improved storage container for recorded media is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the storage container for recorded media is constructed and used, the characteristics of the construction, and the advantageous new and useful results obtained; the new and useful structures, devices, elements, arrangements, parts, and combinations are set forth in the appended claims.

What is claimed is:

1. In combination, a disc-shaped item of recorded media having an upper surface, a lower surface, a thickness, an outer diameter, and a centrally-disposed, substantially circular opening; and a storage container for holding the item of recorded media; the storage container having:

a base;

a retaining hub extending upwardly from the base;

the retaining hub having at least a first fixed support and at least one retaining lip;

at least one bump extending up from the first fixed support;

the item of recorded media being disposed between the at least one bump and the at least one retaining lip;

an outer wall extending up from the base; at least one bump projecting up from the outer wall; the lower surface of the item of recorded media resting on the at least one bump on the outer wall; and a blocking wall extending upwardly from the outer wall outside the outer diameter of the item of recorded media; the blocking wall extending above the outer wall substantially the same height as the thickness of the item of recorded media in addition to the height of the bump.

2. The combination of claim 1, wherein the retaining hub includes at least three bumps supporting the item of recorded media.

3. The combination of claim 2, wherein the at least three bumps are equally spaced about the retaining hub.

4. In combination, a disc-shaped item of recorded media having an upper surface, a lower surface, a thickness, an outer diameter, and a centrally-disposed, substantially circular opening; and a storage container for holding the item of recorded media; the storage container having:
   a base;
   a retaining hub extending upwardly from the base;
   the retaining hub having at least a first fixed support and at least one retaining lip;
   at least one bump extending up from the first fixed support;
   the item of recorded media being disposed between the at least one bump and the at least one retaining lip;
   the retaining hub includes at least one resilient arm cantilevered from the base; the retaining lip carried on the resilient arm; and
   a bump connected to the at least one resilient arm; the item of recorded media also disposed between the bump on the resilient arm and the retaining lip.

5. The combination of claim 4, wherein the retaining hub includes three resilient arms cantilevered from the base and a fixed support disposed between each pair of resilient arms.

6. In combination, a disc-shaped item of recorded media having an upper surface, a lower surface, a thickness, an outer diameter, and a centrally-disposed, substantially circular opening; and a storage container for holding the item of recorded media; the storage container having:
   a base;
   a retaining hub extending upwardly from the base;
   the retaining hub having at least a first fixed support and at least one retaining lip;
   the retaining hub including at least one resilient arm cantilevered from the base;
   the retaining lip carried on the resilient arm; and
   a bump projecting up from each of the resilient arms and the fixed supports; the bumps disposed at substantially the same level and engaging the lower surface of the item of recorded media.

7. The combination of claim 6, wherein the item of recorded media is free to rotate on the retaining hub.

8. A storage container for an item of recorded media having an upper surface, a lower surface, a thickness, an outer diameter, and a centrally-disposed, substantially circular opening; the storage container comprising:
   a base;
   a retaining hub projecting up from the base;
   the retaining hub including at least three resilient arms cantilevered from the base and at least three fixed supports, one of the fixed supports disposed between each pair of resilient arms;
   a retaining lip formed on each retaining arm, each retaining lip adapted to engage the upper surface of the item of recorded media;
   each of the three resilient arms being movable between first and second positions;
   each resilient arm adapted to support the lower surface of the item of recorded media in the first position;
   each fixed support disposed at substantially the same level as each resilient arm when the resilient arm is in the first position;
   each resilient arm being disposed below each fixed support when the resilient arm is in the second position;
   each fixed support being connected to the base at the outer radius of the fixed support;
   each of the fixed supports including a first support section extending upwardly from the base, the first support section having a first end and a second end, the first end of the first support section attached to the base; and a second support section extending substantially parallel to the base from the second end of the first support section, the second support having an upper surface; and
   a gusset disposed below each first and second support section.

9. The storage container of claim 8, further comprising a bump projecting upwardly from the upper surface of each of the second support surface.

10. A storage container for an item of recorded media having an upper surface, a lower surface, a thickness, an outer diameter, and a centrally-disposed, substantially circular opening; the storage container comprising:
    a base;
    a retaining hub projecting up from the base;
    the retaining hub including at least three resilient arms cantilevered from the base and at least three fixed supports, one of the fixed supports disposed between each pair of resilient arms;
    a retaining lip formed on each retaining arm, each retaining lip adapted to engage the upper surface of the item of recorded media;
    each of the three resilient arms being movable between first and second positions;
    each resilient arm adapted to support the lower surface of the item of recorded media in the first position;
    each fixed support disposed at substantially the same level as each resilient arm when the resilient arm is in the first position;
    the upper surface of each resilient arm being disposed below the upper surface of each fixed support when the resilient arm is in the second position; and
    each resilient arm including a plurality of sections connected by hinges.

11. The storage container of claim 10, wherein the hinges are adapted to cooperate when a downward force is applied to the resilient arm to move the retaining lip inwardly and downwardly such that the retaining lip may be moved below the lower surface of the item of recorded media.

12. The storage container of claim 11, wherein the hinges and arm sections further are adapted to cause at least a portion of the retaining lip to engage the lower surface of the item of recorded media such that the item of recorded media may be lifted on the retaining lip as the force is removed.

13. The storage container of claim 10, further comprising a center button having a substantially cylindrical, downwardly extending sidewall, the sidewall having an upper end and a lower end; each of the resilient arms connected to the center button.

14. The storage container of claim 13, wherein each resilient arm includes:
    a first arm section having a first end and a second end, the first end of the first arm section being attached to the base by a first hinge;
    a second arm section having a first end and a second end, the first end of the second arm section attached to the second end of the first arm section by a second hinge, the second arm section being substantially parallel to the base when the retaining hub is in the first position;
    a third arm section having a first end and a second end, the first end of the third arm section attached to the second end of the second arm section by a third hinge, the third arm section being substantially normal to the base when the retaining hub is in the first position;

the retaining lip being carried by the third arm section; and a fourth arm section having a first end and a second end, the first end of the fourth arm section attached to the second end of the third arm section by a fourth hinge, the second end of the fourth arm section being attached to the lower end of the sidewall of the center button by a fifth hinge.

15. The storage container of claim 14, wherein the first hinge has a scalloped portion that decreases the thickness of the first hinge.

16. The storage container of claim 14, further comprising a bump projecting up from the second arm section.

17. The storage container of claim 14, wherein each of the hinges being a living hinge having a minimum thickness; the thickness of the first and fifth hinges being substantially less than the thicknesses of the other hinges.

18. The storage container of claim 14, wherein the second end of the second arm has an opening that splits the third hinge into two sections.

19. The storage container of claim 14, further comprising a projection extending up from each retaining lip.

20. A storage container for an item of recorded media having an upper surface, a lower surface, a thickness, an outer diameter, and a centrally-disposed, substantially circular opening; the storage container comprising:

a base;

a retaining hub projecting up from the base;

the retaining hub including at least three resilient arms cantilevered from the base and at least three fixed supports, one of the fixed supports disposed between each pair of resilient arms;

a retaining lip formed on each retaining arm, each retaining lip adapted to engage the upper surface of the item of recorded media;

each of the three resilient arms being movable between first and second positions;

each resilient arm adapted to support the lower surface of the item of recorded media in the first position;

each fixed support disposed at substantially the same level as each resilient arm when the resilient arm is in the first position;

the upper surface of each resilient arm being disposed below the upper surface of each fixed support when the resilient arm is in the second position; and at least one outer support connected to the base at a location spaced from the retaining hub; the outer support having a support surface substantially level with the fixed supports.

21. The storage container of claim 20, further comprising a plurality of bumps projecting up from the outer support.

22. A storage container for an item of recorded media having an upper surface, a lower surface, a thickness, an outer diameter, and a centrally-disposed, substantially circular opening; the storage container comprising:

a base;

a retaining hub projecting up from the base;

the retaining hub including at least three resilient arms cantilevered from the base and at least three fixed supports, one of the fixed supports disposed between each pair of resilient arms;

a retaining lip formed on each retaining arm, each retaining lip adapted to engage the upper surface of the item of recorded media;

each of the three resilient arms being movable between first and second positions;

each resilient arm adapted to support the lower surface of the item of recorded media in the first position;

each fixed support disposed at substantially the same level as each resilient arm when the resilient arm is in the first position;

each resilient arm being disposed below each fixed support when the resilient arm is in the second position; and said resilient arms being disposed below said base when the arms are in the second position.

23. A method for removing an item of recorded media from a storage container; the item of recorded media having a centrally-disposed, substantially circular opening; the storage container having a retaining hub that includes a plurality of resilient arms and a plurality of fixed supports; the resilient arms disposed in the opening of the item of recorded media to retain the item of recorded media on the retaining hub; the method comprising the steps of:

depressing the arms to release the item of recorded media;

supporting the item of recorded media adjacent the opening with the fixed supports to prevent the center of the item of recorded media from deflecting when the arms are depressed;

releasing the arms;

lifting the item of recorded media off of the fixed supports with the arms; and removing the lifted item of recorded media from the arms.

24. The method of claim 23, further comprising the step of supporting the outer edge of the item of recorded media while the arms are depressed.

25. The method of claim 23, further comprising the steps of providing each arm with a projection projecting up from the retaining lip and retaining the item of recorded media on the projections after the item of recorded media has been lifted off of the fixed supports by the arms.

26. The method of claim 23, wherein the step of depressing the arms includes the steps of moving the arms inward and down below the lower surface of the item of recorded media and allowing the arms to expand outward and upward to lift the item of recorded media.

27. The method of claim 26, further comprising the step of moving the arms below the base before allowing the arms to expand.

28. A method of removing an item of recorded media from a storage container; the item of recorded media having a centrally-disposed, substantially circular opening; the storage container having a retaining hub that includes a plurality of resilient arms and fixed supports disposed between the arms; the resilient arms disposed in the opening of the item of recorded media to retain the item of recorded media on the retaining hub; the method comprising the steps of:

providing each of the resilient arms with a retaining lip that engages the upper surface of the item of recorded media before the arms are pushed downwardly;

pushing down on the arms until the retaining lip drops at least partially below the lower surface of the item of recorded media to release the item of recorded media;

supporting the item of recorded media with the fixed supports to prevent the center of the item of recorded media from deflecting when the arms are being pushed down; and lifting the item of recorded media off of the retaining hub.

29. The method of claim 28 further comprising the step of lifting the item of recorded media with the retaining lips when the resilient arms are released.

* * * * *